United States Patent [19]

Meriwether

[11] Patent Number: 4,631,039

[45] Date of Patent: Dec. 23, 1986

[54] PIPE FLOTATION ASSEMBLY

[75] Inventor: Jon D. Meriwether, Follensbee, W. Va.

[73] Assignee: Follansbee Steel Corporation, Follansbee, W. Va.

[21] Appl. No.: 791,317

[22] Filed: Oct. 25, 1985

[51] Int. Cl.⁴ .............................................. B63B 21/52
[52] U.S. Cl. ................................................... 441/133
[58] Field of Search ............................... 441/133–134; 114/266, 267; 37/72; 405/158; 14/27-28

[56] References Cited

U.S. PATENT DOCUMENTS 2,117,008  5/1938  Oswalt ..................................... 14/27
3,921,238  11/1975  Johnson .............................. 441/133

Primary Examiner—Trygve M. Blix
Assistant Examiner—Jesûs D. Sotelo
Attorney, Agent, or Firm—Body, Vickers & Daniels

[57] ABSTRACT

A pipe flotation assembly, packageable in kit form, includes interfitting interconnected frame members having flotation devices secured to the bottom thereof and an adjustable clamping assembly for securing a wide variety of pipe sizes.

9 Claims, 8 Drawing Figures

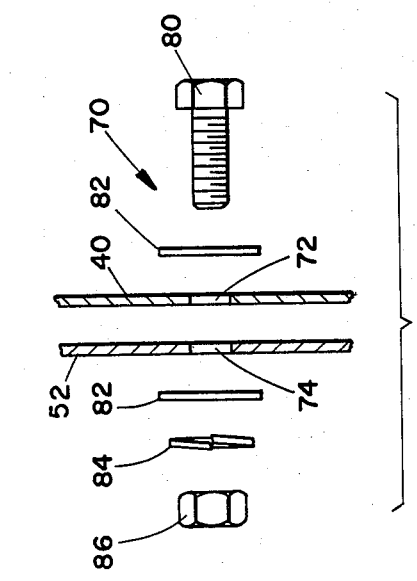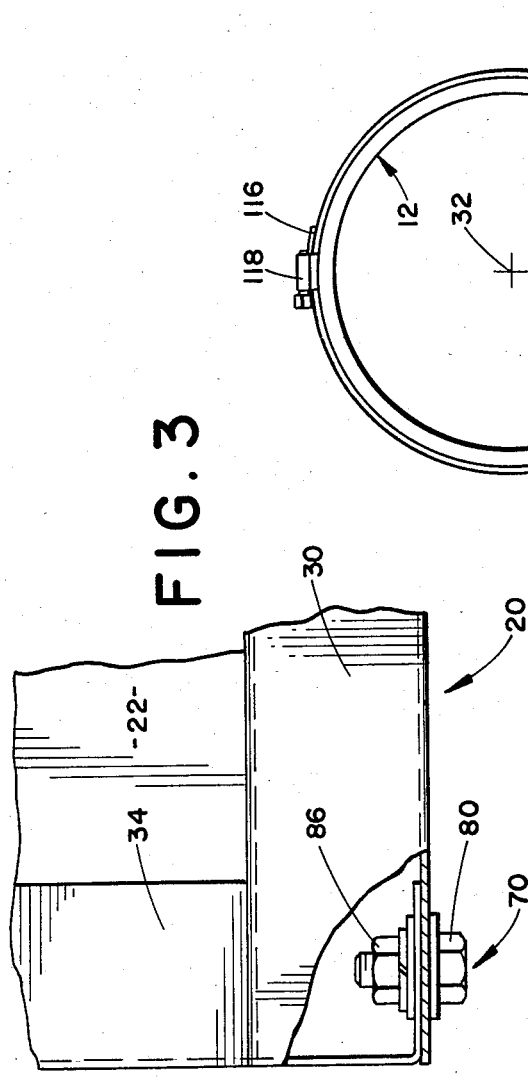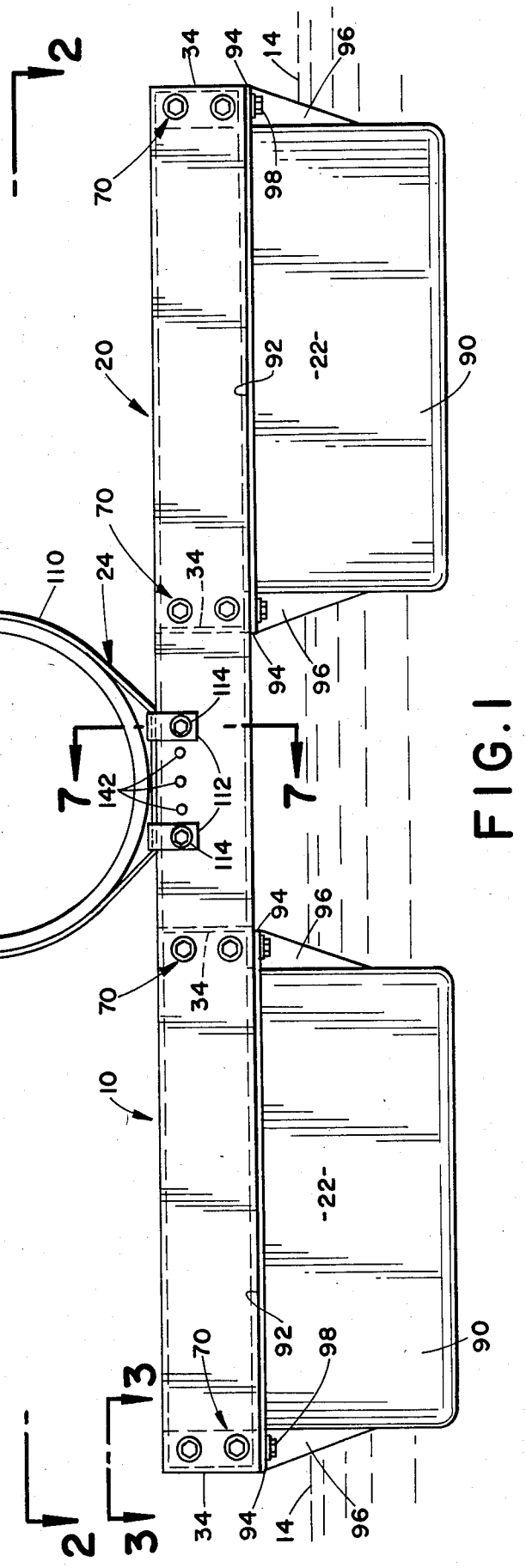

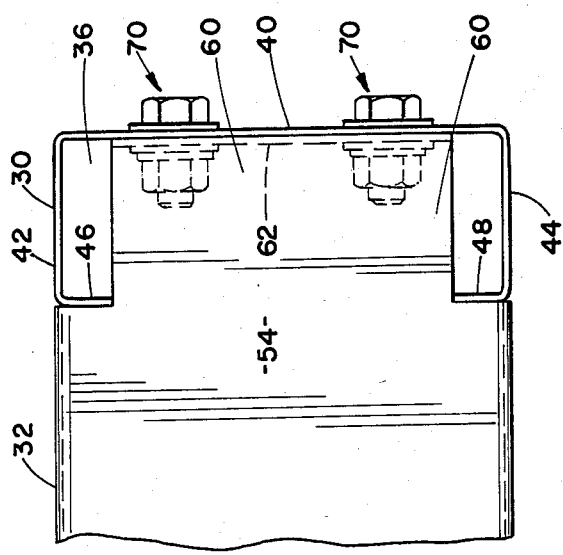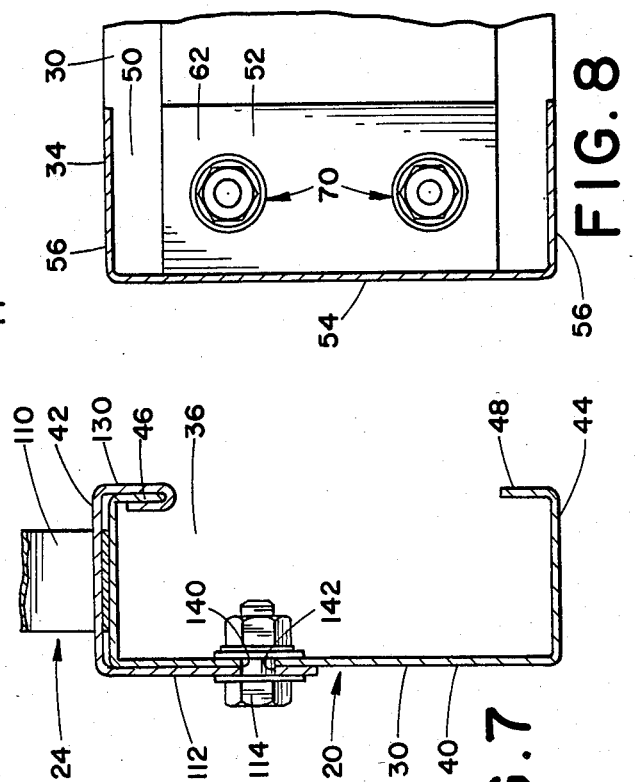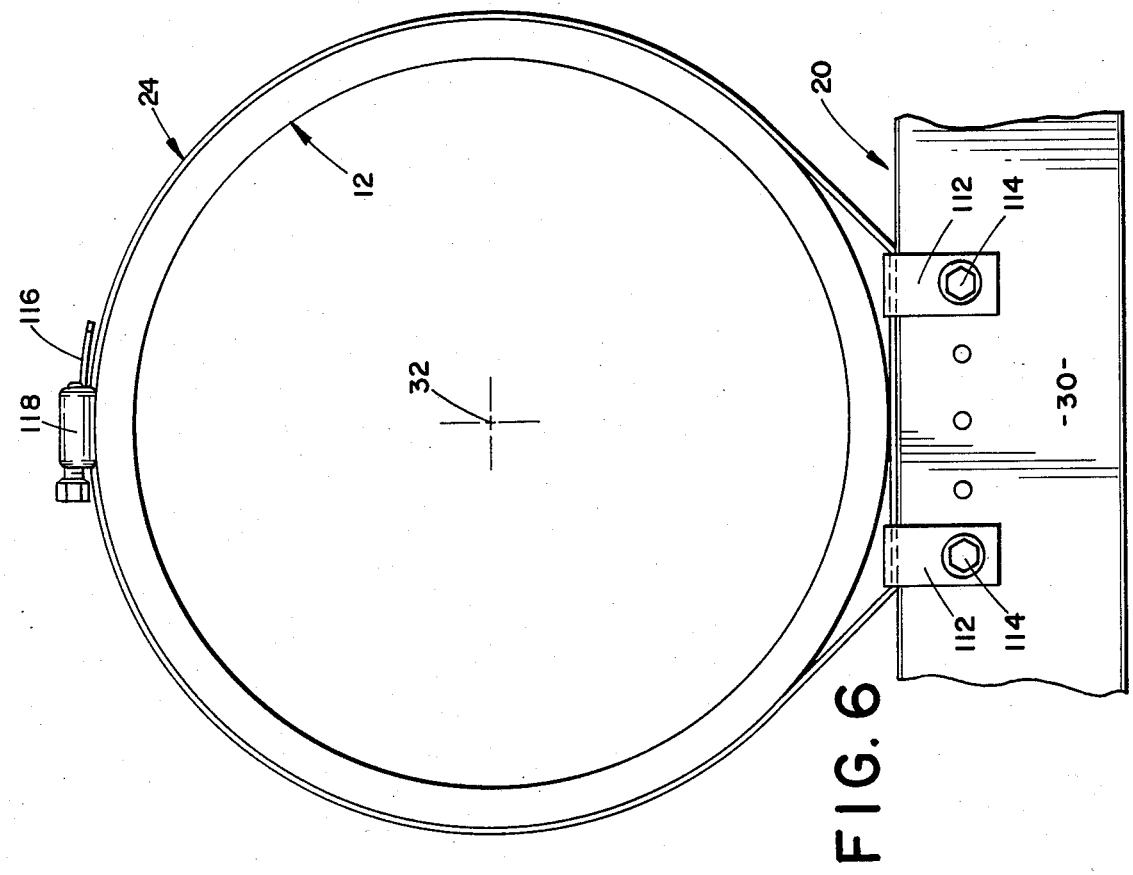

PIPE FLOTATION ASSEMBLY

The present invention relates to pipeline flotation, and in particular, a pipe flotation assembly, amenable to kit form packaging, for carrying a wide range of pipe sizes.

Pipeline flotation is a commonly used technique for routing utility supplies such as oil, water, gas, fluid streams and the like over water bodies between a supply location and a use location. Therein, the pipeline is buoyantly supported at spaced intervals along its length by flotation platforms which allow the pipeline to limitedly rise and fall in accordance with water movement without destroying fluid line integrity thereby eliminating the need for expensive fixed support platforms. Typical flotation devices comprise a frame or platform to which flotation tanks are attached on the undersurface thereof. The pipeline is fixedly connected to the platform by various types of clamping devices. Dependent on the pipe diameter, different clamping devices are required and the platform is designed for each size. This greatly increases the costs and prevents standardization of the design. It also increases the number of designs and/or requires special on-side adapting of the clamping device to the platform for the pipeline being carried thereby. Accordingly, a need exists for a standardized assembly which may be readily assembled on-site with simple tools and without supplemental forming operation while accomodating a wide range of pipe sizes.

BRIEF SUMMARY OF THE INVENTION

The present invention overcomes the above deficiencies and satisfies the needs by providing a standardized flotation assembly packageable in kit form for ready on-site assembly. The assembly incorporates a universal pipe clamping assembly which can be selectively assembled to accommodate and fixedly secure a wide range of pipe diameters. More particularly, two molded plastic flotation tanks are connected to a sheet metal frame member by self tapping screws. The frame member includes standardized side beams which are interconnected by interfitting and standardized cross struts fixedly interconnected hereto by common fasteners. A pair of standardized brackets are interfittingly slidably assembled over the side beams and selectively alignable with predrilled holes formed therealong. A commercially available wormdrive pipe clamp is retained between the brackets and the side beams and defines an adjustable opening through which the pipe may be telescopically received. In addition to the adjustability of the pipe clamp, the brackets may be selectively spaced to increase or decrease the pipe opening for accommodating additional pipe sizes. Moreover, further sizes may be accommodated merely by use of differently sized, inexpensive and commercially available components. Commercial fasteners, interchangeable with the frame fasteners fixedly clamp the brackets to the side beams. Final clamping of the pipe to the frame is effected by adjusting the clamp with conventional tools. Thus the entire assembly comprising flotation tanks, frame members, clamping devices and fasteners may be packaged as a standard unit in kit form for on-site assembly and pipeline installation without special procedures, in a minimum time, with common tools and by unskilled personnel.

Accordingly, it is an object of the present invention to provide a pipeline flotation device for supporting a wide range of pipe sizes.

Another object of the present invention is to provide a pipeline flotation assembly which may be assembled on-site from standard components.

A further object of the invention is to provide a universal clamping device for securing a wide range of pipe diameters to a flotation platform without special tools or procedures.

Still another object of the invention is the provision of a pipeline flotation assembly kit for on-site assembly with simple tools and with the capability of securing a wide range of pipe sizes with commercially available components.

BRIEF DESCRIPTION OF THE DRAWINGS

The above and other objects and advantages of the present invention will become apparent upon reading the following written description taken in conjunction with the following drawings illustrating a preferred embodiment in which:

FIG. 1 is a side elevational view of the preferred embodiment of a pipe flotation assembly in accordance with the present invention;

FIG. 3 is an enlarged partially sectioned view taken along line 3—3 in FIG. 1;

FIG. 4 is an exploded view taken along line 4—4 in FIG. 2;

FIG. 5 is an enlarged partially sectioned view taken along line 5—5 in FIG. 2;

FIG. 6 is an enlarged view taken along line 6—6 in FIG. 2;

FIG. 7 is a view taken along line 7—7 in FIG. 6; and,

FIG. 8 is a view taken along line 8—8 in FIG. 2.

BRIEF DESCRIPTION OF THE PREFERRED EMBODIMENT

Figure 2:
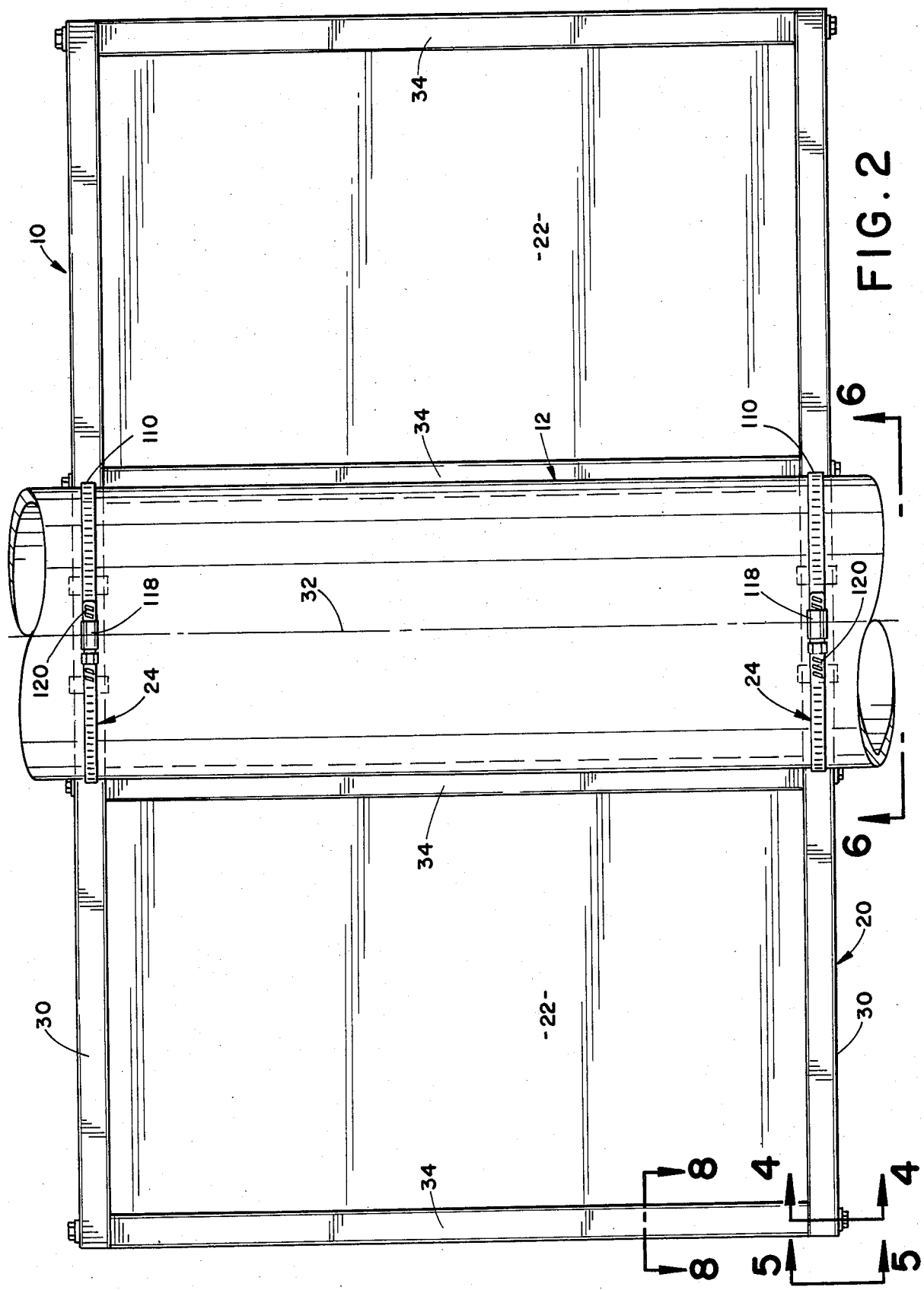
FIG. 2 is a top view of the pipe flotation assembly taken along line 2—2 FIG. 1.

Referring to the drawings for the purpose of illustrating the preferred embodiments only and not for limiting same, FIGS. 1 and 2 show a pipe flotation assembly 10 for floatably supporting a pipe 12 with respect to a body of water, the level of which is representatively indicated by numeral 14. The Pipe 12 constitutes a component of a pipeline which is supported at longitudinally spaced intervals by other pipe flotation assemblies and is connected at its ends to land based or platform based inlet and outlet sources. Accordingly fluid may be conveyed therethrough over a water body for obvious beneficial purposes. It will also be apparent that rather than conveying fluids the pipe or conduit member may be used to route over the flotation assembly other longitudinal utility lines, such as electrical pneumatic, communications lines and the like, as well as providing merely structural interconnections between the assemblies.

The pipe flotation assembly 10 generally comprises a support frame 20, a pair of flotation devices 22 connected to the underside of the frame 20 for buoyantly supporting the assembly 10 in the water body 14, and a pair of clamping assemblies 24 for fixedly clamping the pipe 12 to the frame 20.

The frame 20 comprises a pair of side beams 30 longitudinally spaced transverse to the axis 32 of the pipe 12, and four cross struts 34 interconnected to the side beams 30 at regular intervals therealong and extending parallel to the pipe axis 32.

The side beams 30 and the cross struts 34 are formed of thin guage galvanized steel and may have a top coating therefor for further protective and decorative benefits. Referring to FIGS. 5 and 7, the side beams 30 have a generally C-shaped cross section, the inwardly facing surfaces of which, in addition to increasing the structural integrity thereof, define inwardly opening longitudinal strut receiving channels 36. The side beam 30 is symmetrically formed about a vertical centerline and includes a vertical front or outer wall 40 terminating at its vertical ends with inwardly turned, horizontal top and bottom walls 42 and 44, which terminate with inwardly turned vertical inner walls 46, 48 of narrow width. Because of the symmetry, the side beams 40 are interchangeable in assembly.

The cross struts 34 have a generally U-shaped center section 50 as shown in FIGS. 5 and 8 and L-shaped connector ends 52. The center section 50 is defined by vertical base 54 terminating with inwardly turned horizontal legs 56. The base 54 has a width the same as the width of the wall 40 for the side beams 30. The legs 56 have a width the same as the walls 42, 44 of the side beams 30. Accordingly, in assembly the cross struts 34 and side beams 30 define a uniform width configuration. The connector ends 52 are adapted to be slidably received in the side beam channel 36 and have a vertical leg 60 integral with the base 54 terminating with an inwardly turned foot 62. The width of the leg 60 and the foot 62 are slightly less than the channel opening defined by the inner walls 46, 48. Thus the channel 36 accommodates sliding movement of the connector ends 52 to the illustrated position for final assembly as described in greater detail below.

The cross struts 34 are fixedly connected to the side beams 30 to form a rigid unit by means of fastener assemblies 70. More particularly four vertically aligned pairs of holes 72 are formed along the outer wall 40 of each side beam 30. The holes 72 are aligned with corresponding holes 74 formed in the feet 62 of the connector ends 52. The holes 72, 74 are symmetrically disposed about the horizontal centerline to provide for interchangeability of components as referenced above. As shown in FIG. 4, each fastener assembly 70 comprises a hexagonal head bolt 80, two washers 82, a split lock washer 84 and a hexagonal head nut 86. In conventional fashion, with the holes 72, 74 aligned, the shank of the bolt 80 is inserted therethrough and tightened in conventional fashion to clamp the foot 52 against the base 40 and between the washers to provide a rigid unit.

The flotation device 22 comprises a blow molded polyethylene shell filled with urethane foam. Each device includes a box like base 90 of generally rectangular cross section and a top plate 92 having an outwardly extending peripheral rim 94 generally conforming to the undersurface of adjacent cross struts 34 and the connecting end portions of the side beams 30. The rim 94 is reinforced with the body 90 by a plurality of triangular integrally formed web sections 96. The flotation devices 22 are attached to the frame 20 and the rim 94 by a plurality of self tapping screws and washer assemblies 93. Upon assembly of the flotation devices 22 to the frame 20, further structural rigidity is provided for the flotation assembly 10.

Each clamping assembly 24 comprises a worm drive pipe clamp 110, and a pair of sliding brackets 112 adjustably clamped to the side beams 20 by fasteners 114. The pipe clamp 110 may be any suitable commercial available design and generally comprises an elongated steel strip 116 carrying a worm drive unit 118 at one end which operatively engages inclined slots 120 on the other end which extends therethrough. In a well known manner, the worm drive unit 118 of the clamp 110 may be adjusted by conventional tools to vary the effective peripheral length of the strip 116.

Referring additonally to FIG. 7, the sliding bracket 112 includes an L-shaped section 130, engaging the top and outer walls of the side beam 30, and inwardly terminating with a downwardly depending J shaped section retaining the upper inner wall 46. The section 130 is vertically shiftable with respect to the upper wall 42 of the side beam 30 to accommodate the thickness of the strip 116. The vertical leg of the section 130 includes a through hole 140 which is selectively alignable with one of five longitudinal holes 142 formed in the wall 40 of the side beam 30. As clearly apparent, the pair of brackets 112 together with the pipe clamp are aligned at the end of the side beams and readily shifted into alignment at the desired positions. By means of the fasteners 114, preferably indentical to the frame fasteners, the brackets 112 and the pipe clamp 110 may be fixedly secured to the side beam 30. By selection of bracket locations and/or pipe clamp sizes the opening defined by the strap may be sized to receive and retain a variety of pipe sizes thereby avoiding the need for special drilling and clamping devices.

The above described pipe flotation assembly is well suited for packaging in kit-form for on-site assembly with readily available tools. The standardization of basic components permits ready alignment and connection according to straight forward instructions. Moreover, the low-cost pipe clamps may be included in various sizes to permit the universal securing of the conduits without the need for separately sourced parts. Obviously dependent on the application, many of the components may take other sizes and forms while retaining the assembly benefits described above.

I claim:

1. In a pipe flotation system having a flotation device attached to the underside of a frame member, said frame member having spaced side beam members on which a pipe member is fixedly supported, the improvement comprising: a plurality of longitudinally spaced apertures in each of said side beam members; a pair of bracket members slidably carried on each of said side members; an aperture in each said bracket member selectively alignable with said plurality of apertures in the side member carrying the said bracket member; fastener means extending through aligned apertures of said side member and said bracket member for fixedly securing said bracket member to said side member; clamping means comprising a thin wall band member having a center portion retained between said bracket member and said side member and having end portions extending above the frame member; adjusting means operative between the end portions of said band member for establishing a closed loop defining a transverse opening, and for varying the effective length of the loop to variably size the transverse opening, for said opening to thereby receive said pipe member therethrough, said adjusting means being adjustable to reduce said opening to thereby fixedly clamp said pipe member between said band member and said side member.

2. A pipe flotation assembly for buoyantly carrying a member on a body of water comprising:

a generally rectangular frame member formed of sheet metal channels including a pair of side beams interconnected by a plurality of cross struts, said side beams including a relatively wide vertical outer wall and a relatively narrow vertical inner wall interconnected by a horizontal top wall;

a pair of brackets slidably carried by each of said side beams, each bracket including a front, a top, and an inner portion, said portions overlying the outwardly facing surfaces of said outer wall, said top wall, and said inner wall of said side beams, a reversely bent section on said bracket integrally connected with said inner portion defining an upwardly opening slot for slidably retaining said inner wall of said side beam;

a plurality of apertures formed longitudinally along each of said outer walls of said side beams;

an aperture formed in said front portion of each said bracket, said aperture being alignable with said plurality of apertures in said outer wall of said side beam upon selective sliding movement of the said bracket with respect thereto;

first fastener means associated with each bracket having a shank extending through aligned apertures in said bracket and said side beam for longitudinally adjustably securing said bracket to said side beam;

a pair of flexible closed loop clamping rings, each having a portion captured between said top portions of a pair of said brackets and said top wall of said side beam, said clamping rings defining transverse openings for receiving said pipe member therethrough, said clamping rings including means for enlarging and contacting said opening to facilitate the receiving and to effect the clamping of said pipe member, said brackets being selectively alignable with said side beams and secured at aligned apertures for further defining said opening whereby a plurality of pipe sizes may be accommodated; and flotation means secured to said frame member for providing buoyancy for said frame member and the pipe member carried thereon.

3. The pipe flotation assembly as recited in claim 2 wherein said clamping rings include a thin wall band having a central portion and free end portions, said central portion being captured between said brackets and said side beams, and worm drive means interconnecting said free end portions of said band for said enlarging and contracting of said opening.

4. The pipe flotation assembly as recited in claim 3 wherein said cross struts have end portions configured for sliding movement with respect to the inwardly facing surfaces of said outer walls of said side beams, said cross struts and said outer walls of said side beams including alignable apertures for locating the cross struts at longitudinally spaced positions along the length of said side beams, and second fastener means extending through said apertures and fixedly connecting said end portions of said cross struts to said side beams.

5. The pipe flotation assembly as recited in claim 4 wherein said cross struts comprise two pair of laterally spaced members, each pair being connected at the distal ends thereof to said side beams, and said flotation means comprise a pair of flotation devices, each device having an upper rim portion engaging one pair of said laterally spaced members and said side beams connected thereto, and third fastener means for fixedly connecting said upper rim portion of said flotation devices to the connected spaced members and said side beams.

6. The pipe flotation assembly as recited in claim 3 wherein said plurality of apertures are formed symmetrically with respect to the longitudinal center of said side beams, and said brackets are alignable at said apertures for varying the length of said central portion of said clamping ring captured between said brackets and said side beams to thereby enlarge and contract said opening.

7. A pipe flotation assembly kit comprising in combination:
(a) a pair of elongated side beam members having walls defining a longitudinal channel;
(b) a plurality of cross beam members having end portions thereof adapted for sliding movement within said channel when positioned transversely thereto;
(c) first fastener means for securing said end portions of said cross beam members to said side beam members;
(d) a pair of flotation devices;
(e) second fastener means for securing said flotation devices to said beam members;
(f) a pair of flexible closed loop clamping rings, each carrying adjusting means for expanding and contracting the opening defined by said loop;
(g) first and second pairs of bracket means configured for captured longitudinal sliding movement with respect to said side beam members and for retaining a portion of the clamping ring therebetween; and
(h) third fastener means for adjustable fixedly securing one pair of said bracket means to each of said side beam members.

8. The assembly kit as recited in claim 7 wherein said clamping rings comprise pipe clamps having a flexible band defining a closed loop and worm drive means operative between the ends of said band for selectively enlarging said opening.

9. The assembly kit as recited in claim 8 wherein said side beam members include a longitudinal series of apertures and said bracket means each include an aperture, alignable with each of said apertures in said longitudinal series, and said third fastener means includes shank portions insertable through aligned apertures of said side beam members and said bracket means.

* * * * *